Dec. 7, 1965      B. J. KAYSER, JR      3,222,639
ALARM APPARATUS FOR VEHICLE OPERATOR
Filed Aug. 31, 1961                                    2 Sheets-Sheet 1

*INVENTOR.*
*BERNARD J. KAYSER JR.*
BY
*HIS ATTORNEYS*

Dec. 7, 1965  B. J. KAYSER, JR  3,222,639
ALARM APPARATUS FOR VEHICLE OPERATOR
Filed Aug. 31, 1961  2 Sheets-Sheet 2

INVENTOR.
BERNARD J. KAYSER JR.
BY
Dybvig and Dybvig
HIS ATTORNEYS

United States Patent Office 3,222,639
Patented Dec. 7, 1965

3,222,639
ALARM APPARATUS FOR VEHICLE OPERATOR
Bernard J. Kayser, Jr., Delphos, Ohio, assignor to Driv-A-Lert Corporation, Delphos, Ohio, a corporation of Ohio
Filed Aug. 31, 1961, Ser. No. 135,165
10 Claims. (Cl. 340—52)

This invention relates to an alarm apparatus for indicating lack of alertness of an operator of a motor vehicle.

In my United States patent, No. 2,875,430, an alarm apparatus is described that is designed to alert the operator of a motor vehicle should he become drowsy. The alarm apparatus described therein embodies detector means for detecting the operation of a steering mechanism within a given short interval of time, and an alarm means connected to the detector means causing an alarm if the steering mechanism does not so operate within the given interval of time. The invention described therein is based upon the fact that a normally alert operator of a vehicle will rotate or otherwise move the steering mechanism within short intervals of time, usually approximately every two or three seconds. However, an operator of a vehicle who has become drowsy, has fallen asleep or has become ill will fail continuously to move the steering mechanism. Accordingly, it has been found beneficial to sound an alarm to alert the driver should he become drowsy or fall asleep or to sound the alarm to alert others in the vehicle should the operator become ill.

A primary object of this invention is to provide an improved device for detecting the operation of a vehicle steering mechanism within a given short interval of time and for causing an alarm should the operator of the vehicle fail to move the steering mechanism within the given short interval of time.

The detector means described in my aforementioned patent, No. 2,875,430, comprise a roller which is engaged with a cylindrical hub attached to the steering wheel of the vehicle. The detector means is so designed that any movement of the steering wheel is detected to avoid the sounding of an alarm regardless of the position of the steering wheel. Conversely, should the steering wheel not be moved within a short interval of time for any reason whatsoever, the alarm will sound. However, it has been found preferable to render the alarm responsive to lack of movement of the steering wheel only over a limited range of movement of the steering wheel. Thus, should an operator of a motor vehicle be negotiating a long curve in a road, he may find it necessary to hold the steering wheel in a fixed position. Were the alarm means responsive to failure of movement of the steering wheel at such fixed position, the alarm would sound. Rather than aid the operator of the vehicle, this may startle the operator causing him to jerk the steering wheel. Also, should the motor vehicle be stopped for a traffic signal, the operator would have no occasion to continue moving the steering wheel every two or three seconds. Again, if the alarm were responsive to lack of movement while the vehicle is stopped, the alarm could startle the operator. However, by providing mechanism which enables the operator to render the alarm means insensitive to movement of the steering wheel while the vehicle is stopped, this problem is obviated.

Accordingly, a further and more specific object of this invention is to provide means to disable the alarm during certain driving conditions, such as when the vehicle is negotiating a curve or when the vehicle is stopped. This object is accomplished herein by making the alarm responsive to failure of movement of the steering mechanism only during a limited range of movement thereof. Thus, when used in an automobile, the alarm is responsive to failure of movement of the steering wheel while the automobile is being driven along a comparatively straight road but is not responsive when the automobile is turning a corner. Also, should the vehicle come to a stop for a traffiffc signal or for any other reason, the operator thereof may simply rotate the steering wheel by a one-quarter or one-half turn to disable the alarm.

Most road vehicles such as cars and trucks are driven several thousand miles each year and the steering mechanism moved several times each mile. The means for detecting movement of the steering mechanism must accordingly be capable of reliable sensing movement of the steering mechanism perhaps several million times. When used in an automobile or truck, the detector means must be capable of reliably sensing movements of the steering mechanism on the order of one or two degrees of rotation. It may readily be seen that the requirements for reliability and accuracy of the detector means are quite stringent. In addition, the detector means must be sufficiently rugged to withstand the vibration always present in cars and trucks.

Accordingly, still another more specific object of this invention is to provide improved, reliable and sensitive detector means to detect or sense movement of the steering mechanism of a vehicle. Also, it is an object of this invention that such a reliable and sensitive detector means be simple and inexpensive, but of rubbed construction.

As described in my aforementioned patent, No. 2,875,430, the means for causing the alarm includes timer means which is set to a zero time condition each time the steering mechanism is moved. Thereafter, the timer means is operable to cause actuation of an alarm or indicator after a predetermined intervals of time unless the steering mechanism is again moved to reset the timer means to a zero time condition.

Another more specific object of this invention is to provide improved timer means responsive to movement of the steering mechanism of a vehicle, the improved timer means comprising an electronic timing circuit. As will be more fully described below, the circuit includes a transistor which becomes operative after a predetermined interval of time, which interval is determined by a time delay circuit including at least one timing capacitor and a variable resistor or potentiometer. The time delay circuit is reset to a zero time condition each time the steering mechanism is used.

Other objects and advantages reside in the construction of parts, the combination thereof, the method of manufacture and the mode of operation, as will become more apparent from the following description.

Figure 1:
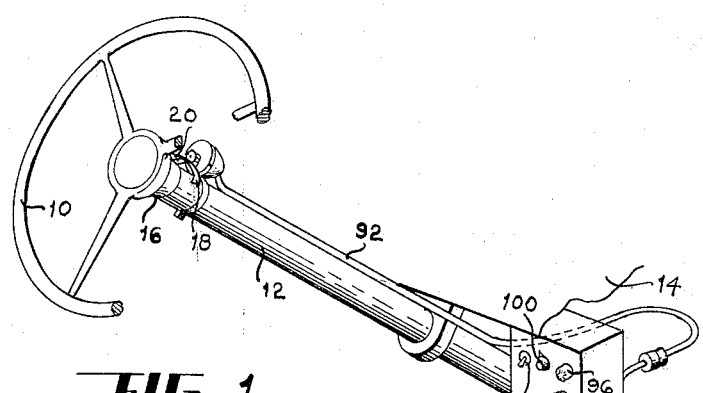
FIGURE 1 is a perspective view, with parts broken away, showing a preferred embodiment of an alarm apparatus made in accordance with this invention operably connected to the steering mechanism of a motor vehicle.

Referring to FIGURE 1, a steering mechanism of a motor vehicle is shown therein comprising a steering wheel 10 supported by a steering column 12. As is well known, the steering column 12 projects through the floor of the vehicle underneath a panel or dashboard indicated at 14.

The steering wheel 10 is provided with a cylindrical hub 16 which rotates relative to the steering column 12. A curved control plate 18 is fixedly attached by means of a bracket 20 to the hub 16 and is adapted to rotate therewith. The curved control plate 18 is generally concentric with the axis of rotation of the hub 16 and the steering column 12, but surrounds only a limited portion thereof, being nearly semi-circular in form.

Figure 2:
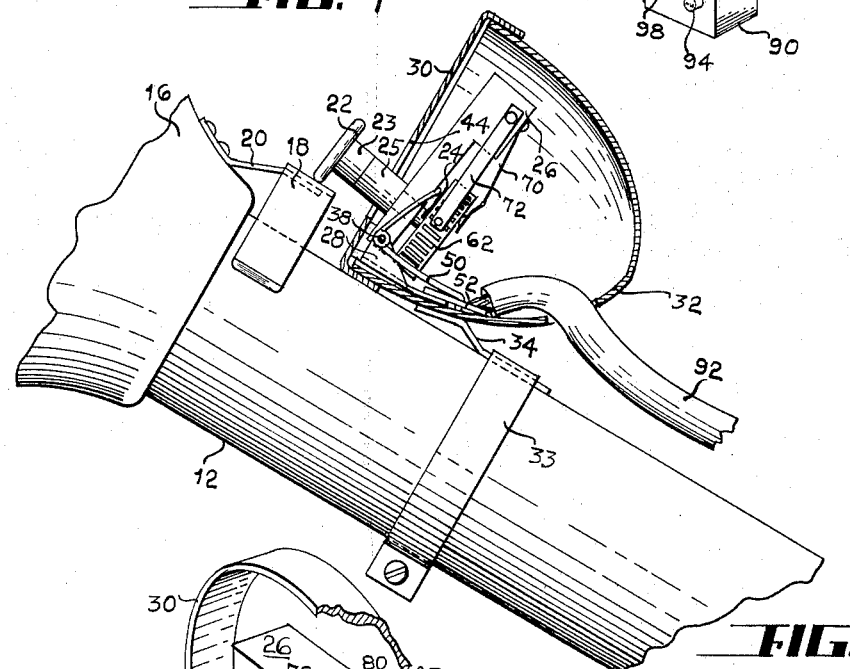
FIGURE 2 is a side elevational view of a portion of the steering mechanism shown in FIGURE 1 along with a detector portion of the alarm apparatus shown in longitudinal cross section.
Figure 3:
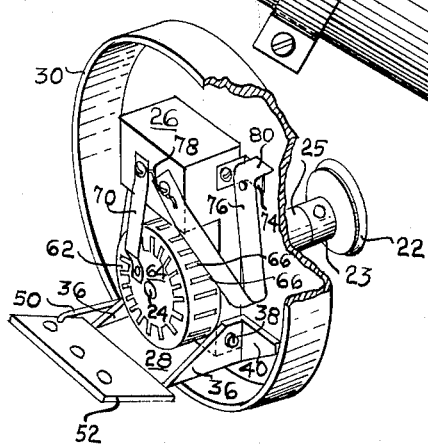
FIGURE 3 is a perspective view, with portions broken away, of parts of the detector.

As best illustrated in FIGURE 1, the ends of the control plate 18 are turned in slightly toward its radius for reasons which will be made apparent later. A roller 22 is in engagement with the plate 18 and rotatable thereon. The roller 22 is attached by a hub portion 23 to a drive shaft 24 which is supported for rotation within a sleeve 25 and a support block 26. The block 26 is mounted upon a support bracket 28 which in turn is attached to a detector housing cap 30 press fit on a detector housing 32 which is attached to the steering column 12 by means of a clamp 33 and an arm 34. As best seen in FIGURES 2 and 3, the bracket 28 includes a pair of parallel spaced upstanding flanges 36 provided with colinear, opposed apertures which receive a pivot pin 38. Each of the flanges 36 is provided with an outwardly projecting ear 30 which is attached as by welding or screws (not shown) to the rear wall of the housing cap 30. The cap 30 is provided with an elongate aperture 44 which receives the drive shaft 24 and the surrounding sleeve 25.

The support block 26 is mounted for rotation on the pin 38 and is biased in a counterclockwise direction, as viewed in FIGURE 2, into a vertical position adjacent the cap 30 by means of a wire spring 50 coiled at an intermediate portion thereof about one end of the pin 38. One end of the spring 50 is engaged with a center portion of the support block 26 while the other end is engaged in an aperture in an insulating plate 52 attached to the rear of the bracket 28.

A cylindrical, multiple, rotary contact member 62 is supported on the rear end of the drive shaft 24, that is, the end of the shaft 24 that projects behind the rear side of the support block 26. The cylindrical contact member 62 includes a contact plate 64 mounted on its rear face and a plurality of longitudinally extending contact strips 66 lying on its outer periphery. The plate 64 is connected to each of the strips 66. Contact members of this type are commercially available and are made from a suitable cylindrical piece of insulating material in which the contact plate 64 and strips 66 are embedded.

The contact member 62 forms part of a circuit, which will be described later, used to detect the movement of the steering wheel and is connected to the circuit first, by means of a spring contact strip 70 mounted on the rear of the support block 26 and second, by means of a spring contact member 72 mounted on the side of the support block 26. Note that the support block 26 is generally in the shape of an inverted L, as viewed in FIGURE 2, the spring contact strips 70 and 72 being mounted upon the base of the L which overlies the rotatable contact member 62. The contact strip 70 remains in rotatable contact with the contact plate 64 while the strip 72 serially or intermittently engages the contact members 66. It is thus apparent that if the contact member 62 were rotated, a circuit including the strips 70 and 72 would be repeatedly opened and closed.

The contact strip 72 and the contact member 62 form a first switch located in the detector housing 32. A second switch located in the detector housing 32 comprises a small L-shaped contact plate 74 which is fixed to the side of the support block 26 opposite the side to which the strip 72 is attached. A spring contact strip 76 is attached to the rear side of the block 26 adjacent the contact strip 70. The contact strips 70 and 76 may be electrically connected as by a wire 78, shown in FIGURE 3. An intermediate portion of the spring contact strip 76 is bent so as to be cantilevered over the contact plate 74 while the outer end of the strip 76 is bent to provide a forwardly projecting flange 80.

As shown in FIGURES 1 and 2, the housing 32 is attached to the steering column 12 in such a manner that the roller 22 normally engages the control plate 18. This engagement of the roller 22 causes the support block 26 to pivot in a clockwise direction, as viewed in FIGURE 2, to overcome the bias of the spring 50 whereupon the support block 26 and the contact members 74 and 76 are pivoted away from the cap 30. When so pivoted, the spring contact member 76 freely springs into contact and remains in contact with the contact plate 74. Accordingly, the switch formed by the contacts 74 and 76 is normally closed. Should the steering wheel be so rotated that the roller 22 is no longer in engagement with the control plate 18, the spring 50 will bias the support block 26 into a substantially vertical position into engagement with the housing cap 30. Consequently, the flange 80 on the contact member 76 engages the housing cap 30. The contact plate 74 is then pivoted out of engagement with the contact 76. The switch formed by these contacts is thus opened.

As will be discussed below, the switches formed by contacts 74, 76 and 62, 72 are adapted to sense the movement of the steering wheel so as to deenergize an alarm circuit whenever the steering wheel 10 imparts rotation to the roller 22. The control plate 18 is sufficiently long that the roller 22 is engaged thereby under most normal driving conditions. However, should the operator of the vehicle be negotiating a curve, the plate 18 is rotated out of engagement with the roller 22. Also, should the car be stopped, the operator may wish to deenergize the alarm circuit. This can be done by simply rotating the steering wheel 10 by an amount sufficient to disengage the plate 18 from the roller 22. Since the ends of the plate 18 are turned inwardly, as described above, these ends serve as a cam so that no damage is done to the roller 22 when the plate returns from a position out of engagement with the roller 22 into engagement with the roller 22.

No special materials are required for the mechanism as thus far described. The housing 32, its cap 30 and the control plate 18 may be made from a suitable metal such as aluminum. The support block 26 may be made from nylon while the sleeve 25 may be integral therewith. Desirably, if the control plate 18 is made from metal, the roller 22 should have a suitable elastomeric rim so that there is sufficient friction between the members 18 and 22 that the roller 22 is positively rotated upon rotation of the plate 18.

The switches formed by contacts 62, 72 and 74, 76 are connected to a control box 90 through a cable 92 which includes wires connected through leads to the various contact members. Thus, there is one lead connected to the contact 74, another lead connected to the wire 78 connecting the contact strips 70 and 76, and a third lead connected to the contact strip 72. These leads, which engage the wires in the cable 92 at the insulating plate 52, are not shown in the drawing so that the structure of the contact members may be more easily understood. The control box 90 houses an alarm circuit and includes on its front face a fuse housing 94, a signal lamp 96, an on-off switch 98, and a time delay adjusting knob 100. The connection of the detector means and the various elements 94 through 100 will now be described.

Figure 7:
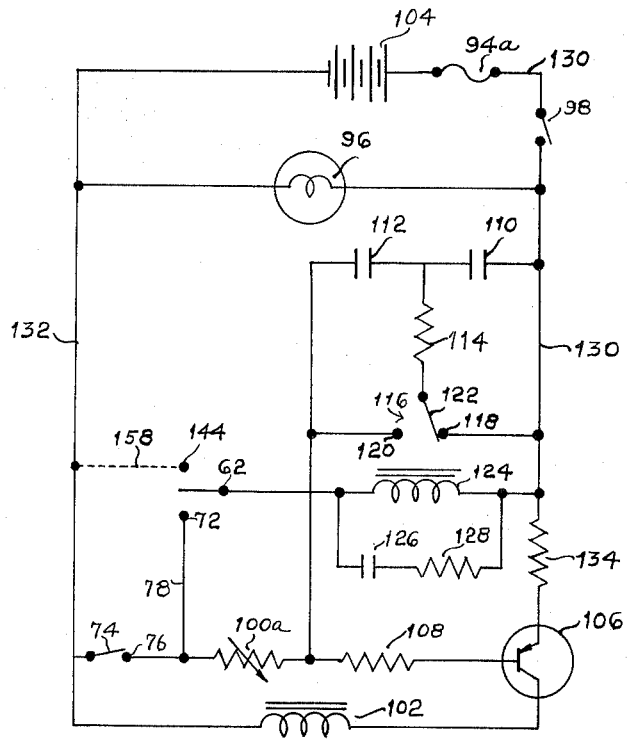
FIGURE 7 is a schematic wiring diagram of an electric circuit for use in the alarm apparatus made in accordance with this invention.

The circuit for energizing an alarm is shown in FIGURE 7, wherein the various circuit elements described above are designated by the same reference characters.

An alarm relay 102 is placed in series with the terminals of a battery 104 which may be the usual automobile or truck battery. The relay 102, when energized, is adapted to energize an alarm. Of course, various alarm devices may be used such as bells or horns or suitable visual indicators of one type or another such as a flashing light. The fuse 94a is placed in series with one terminal of the battery 104 along with the on-off switch 98. The lamp 96 is placed across the battery terminals so that when the switch 98 is closed, the lamp 96 glows to indicate that the alarm apparatus is in condition to signal the alarm should the operator fail to move the steering wheel within a given interval of time.

The alarm relay 102 is energized when sufficient current is supplied thereto through a transistor 106 connected in series between the relay 102 and the battery 104. As is well known, the emitter-to-collector circuit of the transistor 106 will become conductive only when a sufficient current passes through its emitter-to-base circuit. Accordingly, the second switch comprising contact members 74 and 76 is placed in the base circuit of the transistor in series with a base resistor 108 and a variable resistor or potentiometer 100a, the resistance of which is varied by means of the adjusting knob 100 mounted externally of the control box 90. So long as the contacts 74 and 76 are separated, no current can flow through the emitter-to-base circuit of the transistor 106. Accordingly, no current flows through the emitter-to-collector circuit to the alarm relay 102. Thus, unless the roller 22 is engaged with the control plate 18 and the contacts 74, 76 thereby closed, the alarm relay 102 cannot be triggered.

A timer or timing circuit comprising a pair of timing capacitors 110, 112 and a resistor 114 is placed in parallel with the emitter-to-base circuit of the transistor 106. The timing circuit is controlled by a relay operated reset switch 116 including a pair of fixed contacts 118, 120 and a movable contact 122. The movable contact 122 intermittently engages the fixed contacts 118, 120 as a timing or relay solenoid 124 is energized and deenergized. The solenoid 124 is connected across the battery 104 through the switch formed by contact elements 62, 72 along with the switch formed by the contact strips 74, 76. A discharge path including a capacitor 126 and a resistor 128 is placed across the terminals of the solenoid 124.

The operation of the circuit shown in FIGURE 7 is as follows. When the roller 22 is in engagement with the control plate 18, the switch formed by contacts 74 and 76 is closed. Assuming the movable switch member 122 to be in engagement with the fixed contact 118, current is supplied from one terminal of the battery 104 through a conductor 130 to the resistor 114, the capacitor 112, the potentiometer 100a and a conductor 132 to the opposite terminal of the battery 104. Of course, the current is a direct current and cannot pass through the capacitor 112. However, the capacitor 112 initially provides very little resistance to the flow of current to one plate of the capacitor 112 and the flow of current away from its other plate. The resistance through the timing circuit when the contact 122 first engages the contact 118 is limited to the resistance of the potentiometer 100a, which is quite large, say on the order of four K-ohms. At the same time, the resistance through the transistor emitter-to-base circuit is quite large. In addition to the potentiometer resistance, the emitter-to-base circuit resistance includes the resistance of an emitter resistor 134 and the base resistor 108. Accordingly, so long as the resistance in the time delay line is comparatively small, the flow of current through the emitter-to-base circuit of the transistor is negligible. After a short interval of time, however, a charge builds upon the plates of the capacitor 112, the capacitor 112 ultimately effectively serving as an infinite resistor. As the charge on the capacitor increases, the flow of current in the emitter-to-base circuit of the transistor 106 increases. Accordingly, the emitter-to-collector current steadily increases until sufficient to operate the relay 102.

Under most conditions, however, the relay solenoid 124 is either energized or deenergized due to opening and closing of the switch formed by contacts 66 and 72 before a charge builds upon the plates of the capacitor 112 sufficient to make the emitter-to-collector circuit of the transistor become conductive. Thus, each time the contact 72 makes or breaks contact with one of the strips 66 on the rotatable contact 62, the relay solenoid 124 causes the movable switch contact 122 to move out of engagement with the contact 118 into engagement with the contact 120, or vice versa. If the movable contact 122 were moved from the position shown in FIGURE 7 into engagement with the contact 120, the capacitor 112 would then discharge through the resistor 114. At this point, the capacitor 110 would serve as the timing element for the transistor 106. Thus, charge would begin to build up on the plates of the capacitor 110. Again, the same sequence of events occurs. That is, charge will build up on the capacitor 110 until the relay solenoid 124 is either energized or deenergized by make or break of the contact 72 with one of the contact strips 66. The time in which it takes to build up a charge on one of the capacitors is dependent upon the resistance provided by the potentiometer 100a. By changing the resistance of the potentiometer 100a, it is possible to vary the given interval of time within which the alarm relay 102 will be energized for failure of the operator to move the steering mechanism of the vehicle.

From the foregoing, it is seen that circuit means are provided responsive to the detector means mounted upon the steering column 12 for energizing an alarm should the operator of the vehicle fail to move the steering mechanism within a given interval of time. The given interval of time can be varied by adjustment of the potentiometer 100a. The relay 124 is energized or deenergized each time the steering wheel is moved by just a few degrees thereby causing one of the timing capacitors 110, 112 to discharge and place the other previously discharged capacitor into the timing circuit in parallel with the emitter-to-base circuit of the transistor 106. That is, each time the relay solenoid 124 is energized or deenergized, one of the timing capacitors is reset to a zero time condition. Charge continues to build up on the capacitor which is placed in the timing circuit until such time as the transistor energizes the relay 102 or until the particular capacitor is discharged through the resistor 114 and is again placed in a zero time condition.

Figure 4:
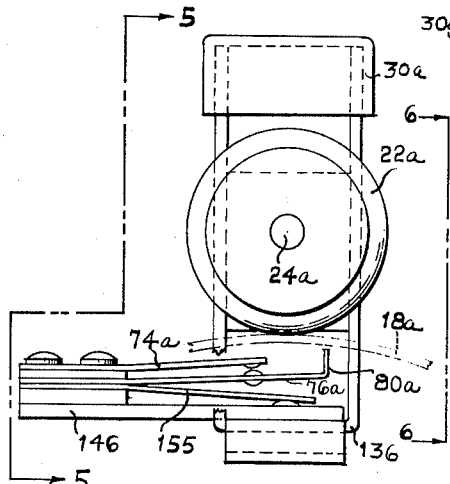
FIGURE 4 is a front elevational view of a portion of a modified embodiment of an alarm apparatus made in accordance with this invention.
Figure 5:
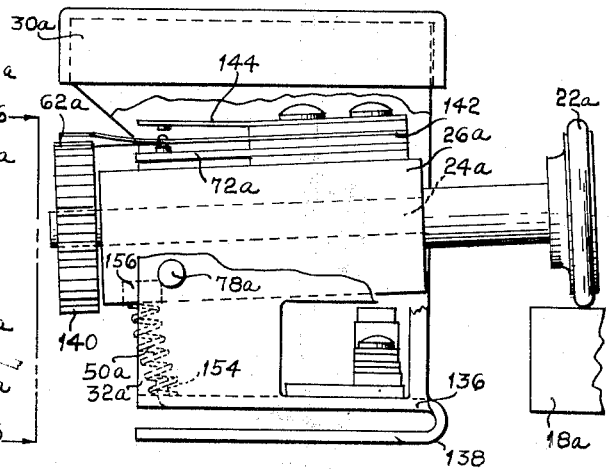
FIGURE 5 is a side elevational view of the modified detector as viewed in the direction of arrows 5—5 in FIGURE 4.
Figure 6:
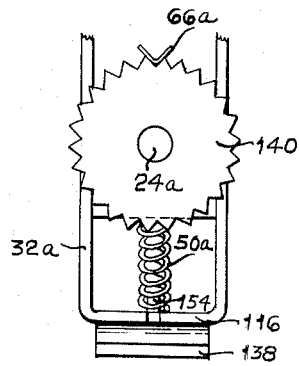
FIGURE 6 is a rear elevational view, with parts broken away, of the modified detector as viewed in the direction of arrows 6—6 in FIGURE 4.

Referring now to FIGURES 4, 5 and 6, a modified form of alarm apparatus is illustrated therein. The same reference characters, but followed with "a" are used to designate parts of the modified embodiment which perform identical or nearly identical functions to the parts of the preferred embodiment described above. This form again uses a roller 22a mounted upon a drive shaft 24a which is adapted to engage a control plate 18a mounted on the hub of a steering wheel (not shown). The drive shaft 24a projects through a longitudinal aperture within a generally rectangular support block 26a, which is pivotally mounted as by a pivot pin 38a that projects through colinear, opposed apertures in opposed walls of a housing 32a. The housing 32a in this case is generally U-shaped as viewed from the front or the rear. The upper portion of the housing 32a is provided with a cap 30a press fit thereon. The housing further includes a base 136 having a folded under flange 138 integral therewith which serves as a bracket arm adapted to be clamped to a steering column (not shown).

A switch actuator comprising a toothed wheel 140 is attached to the rear end of the drive shaft 24a, that is at the end of the drive shaft on the opposite side of the support block 26a from the roller 22a. The teeth on the periphery of the wheel 140 engage an elongate spring contact member 62a which forms a portion of a multiple, stack switch 142 comprising a first fixed contact 72a, the spring contact 62a and a second fixed contact 144. It is apparent from the construction of FIGURE 5 that as the roller 22a is rotated upon rotation of the control plate 18a, the movable contact 62a is forced up and down by the teeth on the wheel 140 whereupon the movable contact 62a is alternately biased into engagement with the contacts 72a and 144. The function of the stack switch 142 is substantially identical to that of the first switch formed by the spring contact strip 72 and the associated multiple contact member 62 described above. As shown in FIGURE 6, the outer or rear end of the spring contact member 62a is bent into a V-shape so as to engage positively between pairs of teeth on the wheel 140. This construction renders the switch mechanism highly insensitive to vibration. The wheel 140 may be made from durable nylon or other suitable insulating material.

As in the embodiment described in relation to FIGURES 1, 2 and 3 above, a second switch is provided in this embodiment which is responsive to engagement of the roller 22a with the control plate 18a. The second switch comprises switch members 74a and 76a stacked upon an insulating strip 146 supported by the base 136 of the housing 32a. When the roller 22a is not engaged with the control plate 18a, the base of the support block 26a engages the top of an upwardly directed flange 80a mounted on the end of the contact spring 76a. For this purpose, a coil spring 50a, one end of which encircles an upstanding boss 154 on the base 136 of the housing, the other end of which is engaged with an aperture 156 within the support block 26a, is located on the opposite side of the pivot pin 38a from the switch members 74a, 76a. The spring 50a normally biases the support block 26a in a clockwise direction, as viewed in FIGURE 5. However, when the roller 22a is engaged with the control plate 18a, the spring 50a is overcome and the contact spring 76a thus springs into contact with the contact member 74a. In order to insure insulation of the contact spring 76a from the housing 32a, an insulating leaf 155 is sandwiched between the insulating strip 146 and the spring 76a.

The operation of the mechanism described in FIGURES 4 through 6 is substantially identical to that described in FIGURES 1 through 3. A review of the operation is therefore believed unnecessary. The circuitry is identical except that an additional conductor member, indicated by phantom line 158 in FIGURE 7 and terminating in the spring contact 144, is placed in the circuit for engagement with the contact designated 62 in FIGURE 7. (Contact 62a in FIGURES 4 through 6 has the same function as contact 62 in FIGURE 7.) The added contact 144 and its conductor 158 are provided to render the detector shown in FIGURES 4 through 6 more sensitive to movements of the steering wheel. Should such high sensitivity be deemed undesirable or unnecessary, the contact 144 may be dispensed with.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In apparatus for maintaining alertness of an operator of steering mechanism of a motor vehicle wherein detector means detects operation of the steering mechanism within a given interval of time and alarm means connected to the detector means causes an alarm if the steering mechanism is not operated within the given interval of time, the improvement wherein said detector means includes a roller, a timing relay, first switch means responsive to rotation of said roller connected in series relation to said timing relay and controlling the operation thereof, a control plate attached to said steering mechanism, means mounting said roller adjacent said control plate, said control plate being constructed and arranged to engage and rotate said roller upon operation of said steering mechanism throughout a limited portion of the range of movement thereof and disengaged from said roller throughout operation of said steering mechanism outside of said limited range of movement; and second switch means responsive to the disengaged condition between said roller and said control plate to disable said alarm means, and wherein said alarm means includes a transistor which, when operative, energizes an alarm, and a time delay circuit controlled by said timing relay connected to said transistor which permits said transistor to become operative only when said second switch means is closed and when said first switch means is not operated by movement of said steering mechanism within a given interval of time.

2. The improvement of claim 1 wherein said means mounting said roller includes a support block and a drive shaft projecting through said support block, said first switch means including a first contact member mounted for rotation upon said drive shaft and a second contact mounted upon said support block.

3. The combination of claim 2 wherein said support block is pivotally mounted, said second switch means being responsive to pivotal movement of said support block caused by engagement of said roller with said control plate.

4. The combination of claim 1 wherein said means mounting said roller includes a support block and a drive shaft mounted therein, and wherein a toothed wheel is mounted for rotation on said drive shaft, said first switch means including at least two contact members, one of said two contact members being a spring contact member engaged by the teeth of said toothed wheel, said spring contact member being biased upon rotation of said toothed wheel into and out of engagement with the other of said two contact members.

5. The improvement of claim 4 wherein said support block is pivotally mounted, said second switch means being responsive to pivotal movement of said support block caused by engagement and disengagement of said roller with said control plate.

6. In apparatus for alerting the operator of a motor vehicle in control of the steering mechanism thereof, the combination comprising detector means detecting operation of the steering mechanism, timer means, alarm means operable by the timer means, the timer means being adjustable to a zero time condition, the timer means being operable from the zero time condition to cause actuation of the alarm means after a given interval of time, and reset means operable by the detector means and connected to the timer means to adjust the timer means to its zero time condition upon each operation of the steering mechanism, said timer means including a pair of timing capacitors and said reset means including means responsive to movement of the steering mechanism alternately to discharge one of said capacitors and simultaneously initiate charging of the other of said capacitors.

7. In apparatus for maintaining alertness of an operator of steering mechanism of a motor vehicle wherein detector means detects operation of the steering mechanism within a given interval of time and alarm means connected to the detector means causes an alarm if the steering mechanism is not operated within the given interval of time, the improvement wherein said detector means includes: a roller; switch means responsive to rotation of said roller; a control plate attached to said steering mechanism; mounting means supporting said roller adjacent said control plate for rolling engagement therewith, said mounting means including a support block and a drive shaft projecting through said support block, said switch means including a first contact member mounted for rotation upon said drive shaft, and a second contact member supported by said support block; said switch means being connected in series relation with a relay to control the operation thereof; and wherein said alarm means includes a transistor which, when operative, energizes an alarm, and a time delay circuit controlled by said relay connected to said transistor which permits said transistor to become operative only when said switch means is not operated by movement of said steering mechanism within the given interval of time.

8. In apparatus for maintaining alertness of an operator of steering mechanism of a motor vehicle wherein detector means detects operation of the steering mechanism, time delay means connected to said detector means is reset each time said detector means detects operation of said steering mechanism, and alarm means controlled by said time delay means causes an alarm if operation of the steering mechanism is not detected within a given interval of time, the improvement wherein the detector means detects movement of the steering mechanism only over a limited range of movement of said steering mechanism, and means are provided for disabling said alarm means during movement of said steering mechanism outside of said limited range of movement.

9. The structure of claim 8 wherein said detector means includes a control plate connected to a portion of said steering mechanism for movement therewith and a roller supported for rolling contact with said control plate.

10. The structure of claim 9 wherein said portion of said steering mechanism rotates, said control plate being generally semi-circular and mounted on said steering mechanism substantially concentric to the axis of rotation thereof, said detector means further includes a pivoted support block which supports said roller for rotation, said block pivoting upon engagement or disengagement of said roller with said control plate, and said means for disabling said alarm means includes a switch responsive to pivotal movement of said support block.

References Cited by the Examiner
UNITED STATES PATENTS

| | | | |
|---|---|---|---|
| 1,808,683 | 6/1931 | Rooney | 340—56 |
| 2,875,430 | 2/1959 | Kayser | 340—279 |
| 2,888,668 | 5/1959 | Colatriano | 340—279 |
| 3,106,981 | 10/1963 | Chakiris | 340—53 XR |

NEIL C. READ, *Primary Examiner.*

THOMAS B. HABECKER, *Examiner.*